United States Patent
Sugasawa et al.

(10) Patent No.: US 8,806,078 B2
(45) Date of Patent: Aug. 12, 2014

(54) INFORMATION PROCESSING DEVICE AND PROGRAM PRODUCT

(75) Inventors: Nobuhiko Sugasawa, Kanagawa (JP); Masataka Goto, Kanagawa (JP); Yuta Kobayashi, Kanagawa (JP); Shinichi Baba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 60 days.

(21) Appl. No.: 13/405,500

(22) Filed: Feb. 27, 2012

(65) Prior Publication Data

US 2013/0067176 A1    Mar. 14, 2013

(30) Foreign Application Priority Data

Sep. 14, 2011   (JP) .................................. 2011-200626

(51) Int. Cl.
   G06F 3/00      (2006.01)
   G06F 13/28     (2006.01)
   G06F 13/00     (2006.01)
   G06F 5/00      (2006.01)

(52) U.S. Cl.
   USPC ................... 710/16; 710/22; 710/25; 710/32; 710/58; 710/59

(58) Field of Classification Search
   None
   See application file for complete search history.

(56) References Cited

U.S. PATENT DOCUMENTS

2006/0129707 A1*  6/2006  Matsuda et al. ................ 710/22

FOREIGN PATENT DOCUMENTS

| JP | 06-274425    | 9/1994  |
|----|--------------|---------|
| JP | 2000-039937  | 2/2000  |
| JP | 2000-284867  | 10/2000 |
| JP | 2002-373145  | 12/2002 |
| JP | 2006-190256  | 7/2006  |
| JP | 2009-025896  | 2/2009  |

OTHER PUBLICATIONS

Japanese Office Action for Japanese Application No. 2011-200626 mailed Jan. 28, 2014 corresponding to U.S. Appl. No. 13/405,500, filed Feb. 27, 2012.

* cited by examiner

*Primary Examiner* — Kris Rhu
(74) *Attorney, Agent, or Firm* — Amin, Turocy & Watson, LLP

(57) ABSTRACT

In an information processing device according to an embodiment, a generating unit generates a descriptor including information indicating an area in a storage unit and state information indicating a state of an entry in which the information indicating the area is stored, and an update unit updates the state information according to at least one of writing and reading of data to the area indicated in the entry selected according to the state information by the input/output unit. The generating unit generates the descriptor in advance before at least one of writing and reading of data to/from the storage unit is started.

8 Claims, 12 Drawing Sheets

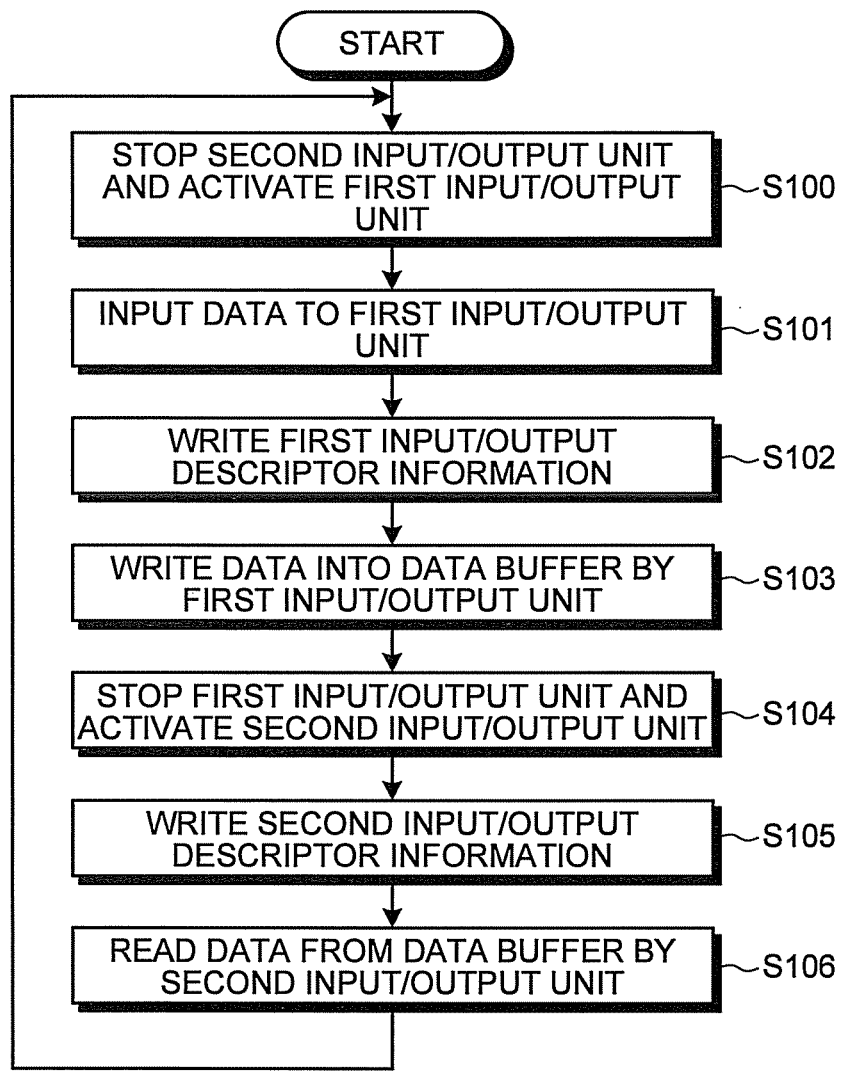

| | READ ADDRESS | WRITE ADDRESS | SIZE | FLAG |
|---|---|---|---|---|
| 1 | – | 0x8000 | 256 | EMPTY |
| 2 | – | 0x8100 | 256 | EMPTY |
| 3 | – | 0x8200 | 256 | ASSIGNED |
| 4 | – | 0x8300 | 256 | ASSIGNED |
| ⋮ | ⋮ | ⋮ | ⋮ | EMPTY |

| | READ ADDRESS | WRITE ADDRESS | SIZE | FLAG |
|---|---|---|---|---|
| 101 | 0x8000 | 0xC000 | 512 | BUFFERED |
| 102 | 0x8400 | 0xC400 | 512 | ASSIGNED |
| 103 | 0x8800 | 0xC800 | 512 | ASSIGNED |
| ⋮ | ⋮ | ⋮ | ⋮ | EMPTY |

| | READ ADDRESS | WRITE ADDRESS | SIZE | FLAG |
|---|---|---|---|---|
| 101 | 0x8000 | 0xC000 | 512 | EMPTY |
| 102 | 0x8400 | 0xC400 | 512 | ASSIGNED |
| 103 | 0x8800 | 0xC800 | 512 | ASSIGNED |
| ⋮ | ⋮ | ⋮ | ⋮ | EMPTY |

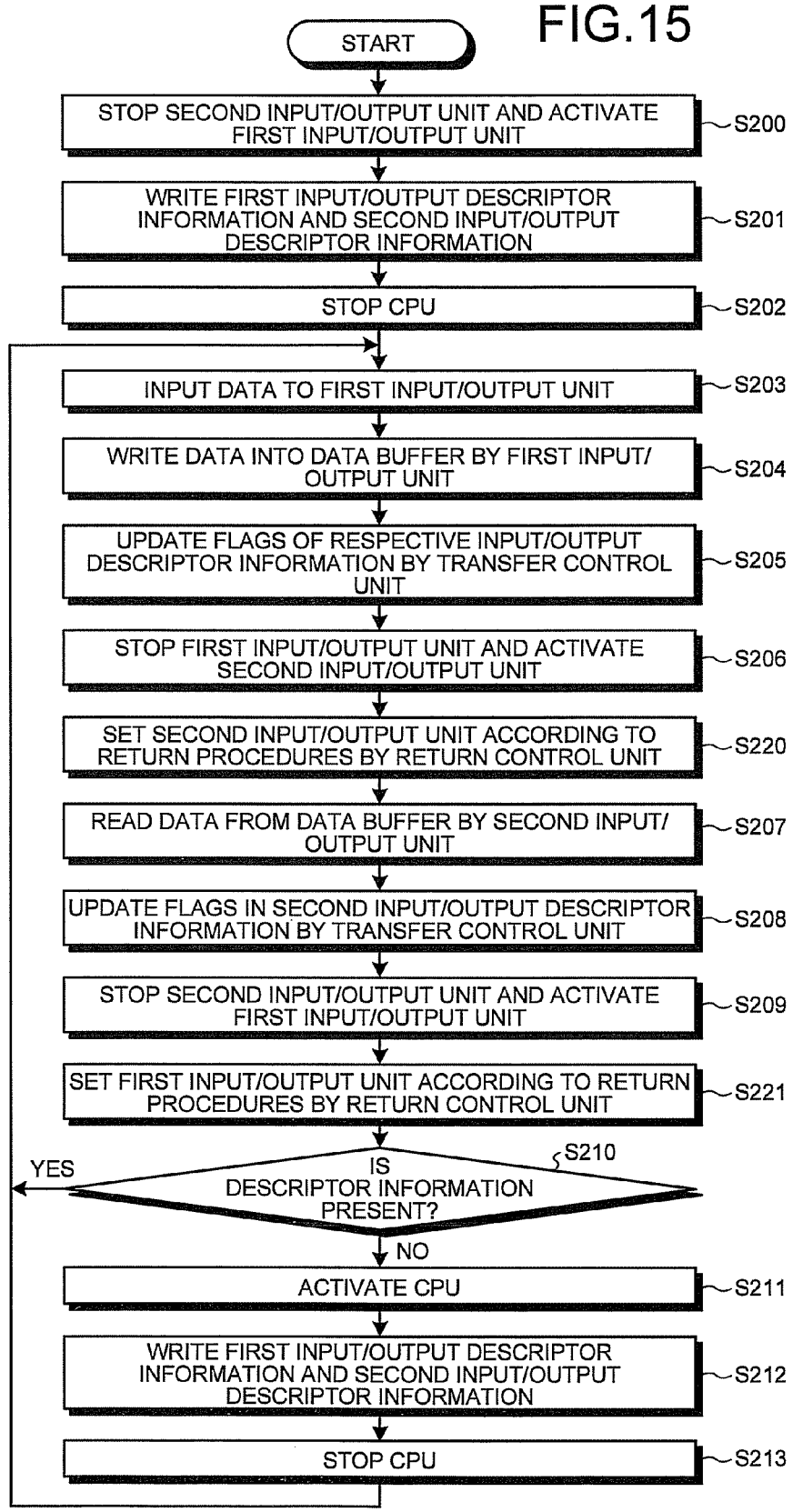

INFORMATION PROCESSING DEVICE AND PROGRAM PRODUCT

CROSS-REFERENCE TO RELATED APPLICATIONS

This application is based upon and claims the benefit of priority from Japanese Patent Application No. 2011-200626, filed on Sep. 14, 2011; the entire contents of which are incorporated herein by reference.

FIELD

Embodiments described herein relate generally to an information processing device and a program product.

BACKGROUND

A controlling method called intermittent control is known as one example of control to control components in an information processing device to be activated or stopped as necessary to reduce power consumption of the entire information processing device.

As one example of the intermittent control, a method in which a central processing unit (CPU) generates descriptor information that is information on input/output of transfer data and an input unit and an output unit refer to the descriptor information to control input/output of transfer data is known.

According to this control method, the CPU can stop operating after generation of the descriptor information and before generation of the next descriptor. In addition, the input unit stops operating after referring to the descriptor information and storing the transfer data into a buffer memory until the next transfer data arrives. The output unit is activated at a time point when writing of the transfer data into the buffer memory is finished, refers to the descriptor information and outputs the transfer data written in the buffer memory.

If the intermittent control is performed on the input and output units, the CPU generates descriptor information each time an event of input/output processing (such as reception of a frame from a network) occurs. There is thus a disadvantage that the throughput decreases since the/overhead on the CPU operation increases in proportion to the frequency of events of input processing.

Moreover, because the CPU is stopped in order to increase the effect of reduction in power consumption, the CPU has to be restarted for generating descriptor information or for other operations, and furthermore, the operating system, the middleware and the like have to be restored as necessary. In this case, there is a disadvantage that the overhead significantly increases.

To the contrary, it can be considered not to perform the intermittent control on the CPU since the likelihood that the throughput is decreased becomes higher if the CPU is stopped. In this case, however, there is a disadvantage that the intermittent control has limited effects in reducing power consumption because the CPU continues operating.

BRIEF DESCRIPTION OF THE DRAWINGS

FIG. 3 is an exemplary flowchart of intermittent control;

FIGS. 9A and 9B are schematic diagrams illustrating examples of descriptor information according to the first embodiment;

FIG. 10 is a schematic diagram illustrating an example of the descriptor information according to the first embodiment;

FIG. 15 is an exemplary flowchart of intermittent control according to the third embodiment.

DETAILED DESCRIPTION

Figure 1:
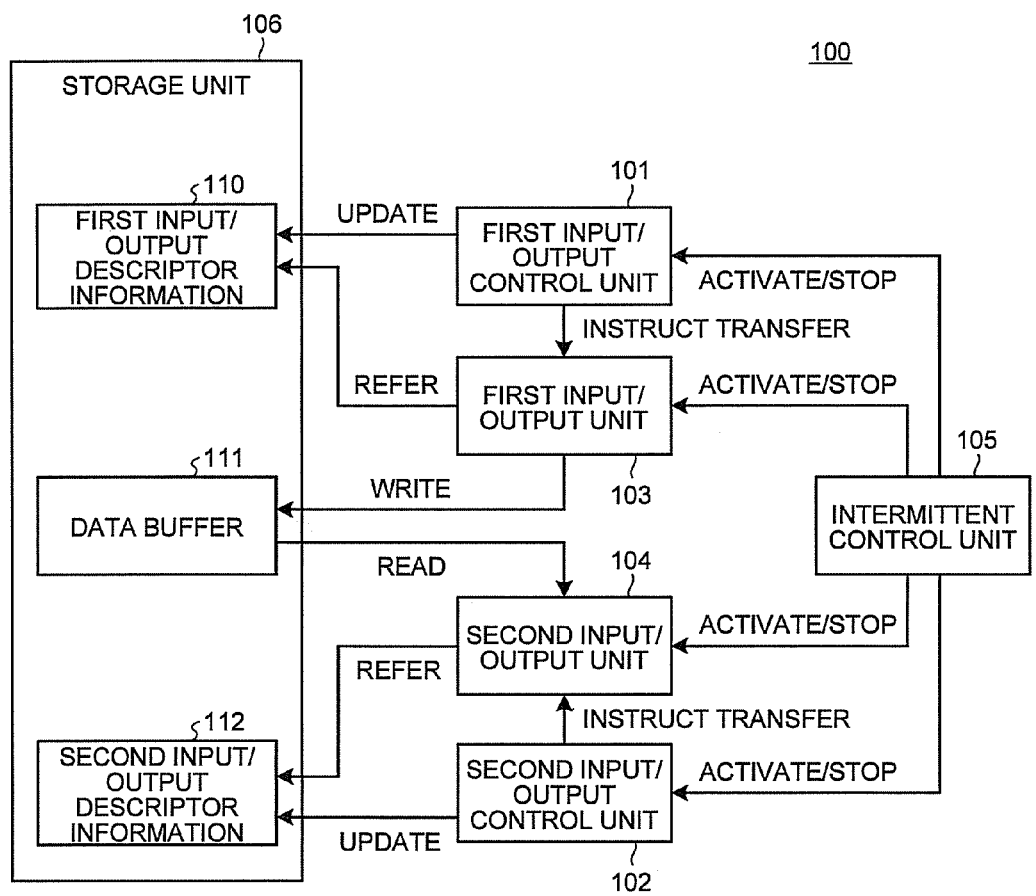
FIG. 1 is an exemplary functional block diagram of an information processing device.

Information processing devices according to respective embodiments will be described below. First, an information processing device to which a data transfer method is applied will be described for easier understanding. FIG. 1 is an exemplary functional block diagram illustrating an information processing device 100 performing intermittent control.

The information processing device 100 includes a first input/output control unit 101, a second input/output control unit 102, a first input/output unit 103, a second input/output unit 104, an intermittent control unit 105 and a storage unit 106. The storage unit 106 corresponds to a main memory in a computer system or the like, stores first input/output descriptor information 110 and second input/output descriptor information 112, and has a data buffer 111 in which data are temporarily stored.

The first input/output unit 103 provides interface functions performing input/output of data in the information processing device 100. A specific example of the first input/output unit 103 is a controller for a network interface. The first input/output unit 103 includes a direct memory access controller (DMAC).

The first input/output descriptor information 110 stored in the storage unit 106 is referred to by the DMAC of the first input/output unit 103 and includes information necessary for performing data transfer by the DMAC. More specifically, the first input/output descriptor information 110 includes entries each including information on a memory area such as a write memory address, a read memory address, and information on the size of data to be transferred. Each entry also includes information (referred to as a status flag) indicating the status of the entries. The first input/output descriptor information 110 is updated by the first input/output control unit 101.

The first input/output control unit 101 provides a transfer instruction to the first input/output unit 103 and updates the first input/output descriptor information 110 when the first input/output unit 103 inputs/outputs data. The first input/ output control unit 101 and the second input/output control unit 102, which will be described later, are configured as software running on a central processing unit (CPU). The CPU controls the entire operation of the information processing device 100 according to programs.

The second input/output unit 104 is a part that provides interface functions performing input/output of data in the information processing device 100 similarly to the first input/output unit 103 described above. A specific example of the second input/output unit 104 is a controller for an SD (registered trademark) memory card. The second input/output unit 104 includes a DMAC.

The second input/output descriptor information 112 stored in the storage unit 106 is referred to by the DMAC of the second input/output unit 104 and includes information necessary for performing data transfer by the DMAC. Since the second input/output descriptor information 112 has a configuration similar to that of the first input/output descriptor information 110 described above, the description thereof is not repeated here. The second input/output descriptor information 112 is updated by the second input/output control unit 102.

The second input/output control unit 102 provides a transfer instruction to the second input/output unit 104 and updates the second input/output descriptor information 112 when the second input/output unit 104 inputs/outputs data.

The intermittent control unit 105 intermittently controls activation and stopping of the first input/output unit 103 and the second input/output unit 104. In addition, the intermittent control unit 105 can stop the CPU when control by the first input/output control unit 101 and the second input/output control unit 102 is not needed and activate the CPU when the control becomes necessary as appropriate.

The data buffer 111 is an area provided in the storage unit 106 for temporarily storing data transferred between the first input/output unit 103 and the second input/output unit 104.

Figure 2:
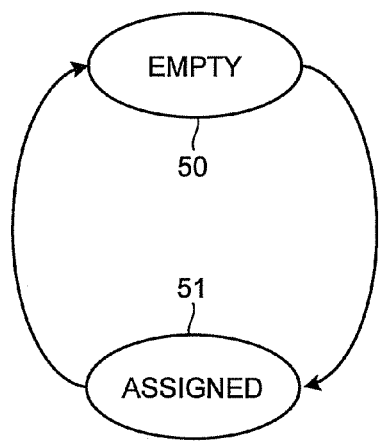
FIG. 2 is a schematic diagram illustrating values to which a status flag can be set.

FIG. 2 illustrates transition between values to which a status flag can be set. As illustrated, the status flag can be set to either of two states: an empty state 50 and an assigned state 51. The initial value is the empty state 50. When the CPU generates the first input/output descriptor information 110 and the second input/output descriptor information 112 for reading/writing data from/to the data buffer 111 by the first input/output unit 103 and the second input/output unit 104, the status flag of each entry is updated from the empty state 50 to the assigned state 51. Note that, in practice, the CPU generates each entry in the state where the status flag is set to the assigned state 51.

Then, when the first input/output unit 103 or the second input/output unit 104 refers to the first input/output descriptor information 110 or the second input/output descriptor information 112 and performs data transfer, the status flag of an entry corresponding to the transfer data is updated from the assigned state 51 to the empty state 50.

FIG. 3 is an exemplary flowchart of intermittent control. The intermittent control suppresses or minimizes the power consumption of the entire information processing device 100 by activating/stopping the components of the information processing device 100 as necessary.

In the following, an example in which transfer data are input to the first input/output unit 103 of the information processing device 100 and are passed to the second input/output unit 104 will be described. It is assumed that the operation of the second input/output unit 104 is suppressed (stopped) during a period during which the first input/output unit 103 is operating, and the operation of the first input/output unit 103 is suppressed during a period during which the second input/output unit 104 is operating.

In step S100, the intermittent control unit 105 controls the second input/output unit 104 to stop operating. At the same time, the intermittent control unit 105 controls the first input/output unit 103 to be activated. The first input/output unit 103 is activated and waits for input of transfer data. In the next step S101, transfer data are input to the first input/output unit 103.

The first input/output unit 103 notifies the first input/output control unit 101 of the input of transfer data. For example, upon input of the transfer data, the first input/output unit 103 issues an interruption to the CPU. As a result of the interruption, an interruption handler is started and the operation of the first input/output control unit 101 is started on the CPU.

Figure 4A:
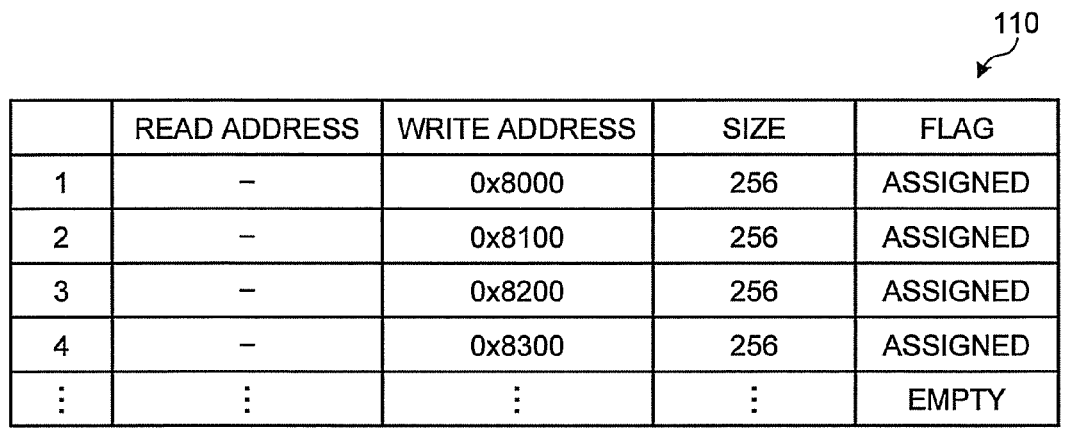
FIGS. 4A and 4B are schematic diagrams illustrating examples of descriptor information.

In the next step S102, the first input/output control unit 101 generates the first input/output descriptor information 110 in response to the notification of data input from the first input/output unit 103, and writes the first input/output descriptor information 110 in the storage unit 106. FIG. 4A illustrates an example of the first input/output descriptor information 110. In the first input/output descriptor information 110, an entry including a write address in the data buffer 111 to which the input transfer data are to be written and size information is generated for the transfer data. At the same time, a status flag indicating the assigned state 51 is stored in the entry.

After writing the first input/output descriptor information 110, the first input/output control unit 101 informs the first input/output unit 103 that the first input/output descriptor information 110 is ready and instructs the first input/output unit 103 to transfer the transfer data.

In the next step S103, the first input/output unit 103 writes the transfer data in the data buffer 111 according to the transfer instruction from the first input/output control unit 101. Specifically, the first input/output unit 103 refers to the first input/output descriptor information 110 written into the storage unit 106 in step S102, obtains the write address and the size information from the entry in which the status flag is set to the assigned state 51, and writes the transfer data into the data buffer 111 according to the obtained information. Upon termination of the writing, the first input/output unit 103 notifies the intermittent control unit 105 of the termination.

In the next step S104, the intermittent control unit 105 that is notified of the termination of writing the transfer data by the first input/output unit 103 instructs the first input/output unit 103 to stop operating and instructs the second input/output unit 104 to be activated. In response to this instruction, the second input/output unit 104 is activated.

Figure 4B:
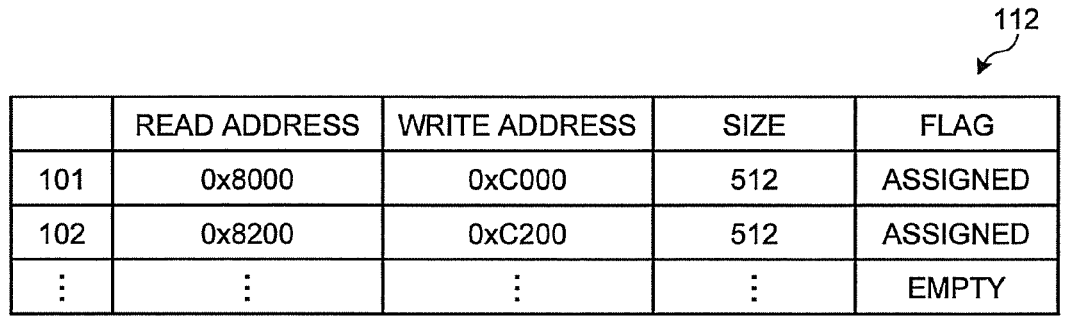

The processing proceeds to step S105 where, upon activation of the second input/output unit 104, the second input/output control unit 102 generates the second input/output descriptor information 112 and writes the second input/output descriptor information 112 into the storage unit 106. FIG. 4B illustrates an example of the second input/output descriptor information 112. In the second input/output descriptor information 112, an entry including a read address in which the transfer data are written, a write address to which the transfer data are to be written and size information indicating the data size for reading is generated. At the same time, a status flag indicating the assigned state 51 is stored in the entry.

After writing the second input/output descriptor information 112, the second input/output control unit 102 informs the second input/output unit 104 that the second input/output descriptor information 112 is ready and instructs the second input/output unit 104 to read the transfer data.

In the next step S106, the second input/output unit 104 refers to the second input/output descriptor information 112 and obtains the read address, the write address and the size information from the entry in which the status flag is set to the assigned state 51. Then, the second input/output unit 104 reads the transfer data from the data buffer 111 on the basis of the obtained read address and size information, and transfers the transfer data to the write address. Upon completion of the transfer, the intermittent control unit 105 is notified of the completion.

Then, the processing returns to step S100 where the first input/output unit 103 is activated and the second input/output unit 104 is stopped by the intermittent control unit 105.

With the control described above, the writing of the first input/output descriptor information 110 by the first input/output control unit 101 and the writing of the second input/output descriptor information 112 by the second input/output control unit 102 occur each time transfer data are input in step S101. Accordingly, it is difficult to stop the operation of the CPU, and the intermittent control has only limited effect in reducing power consumption.

First Embodiment

Figure 5:
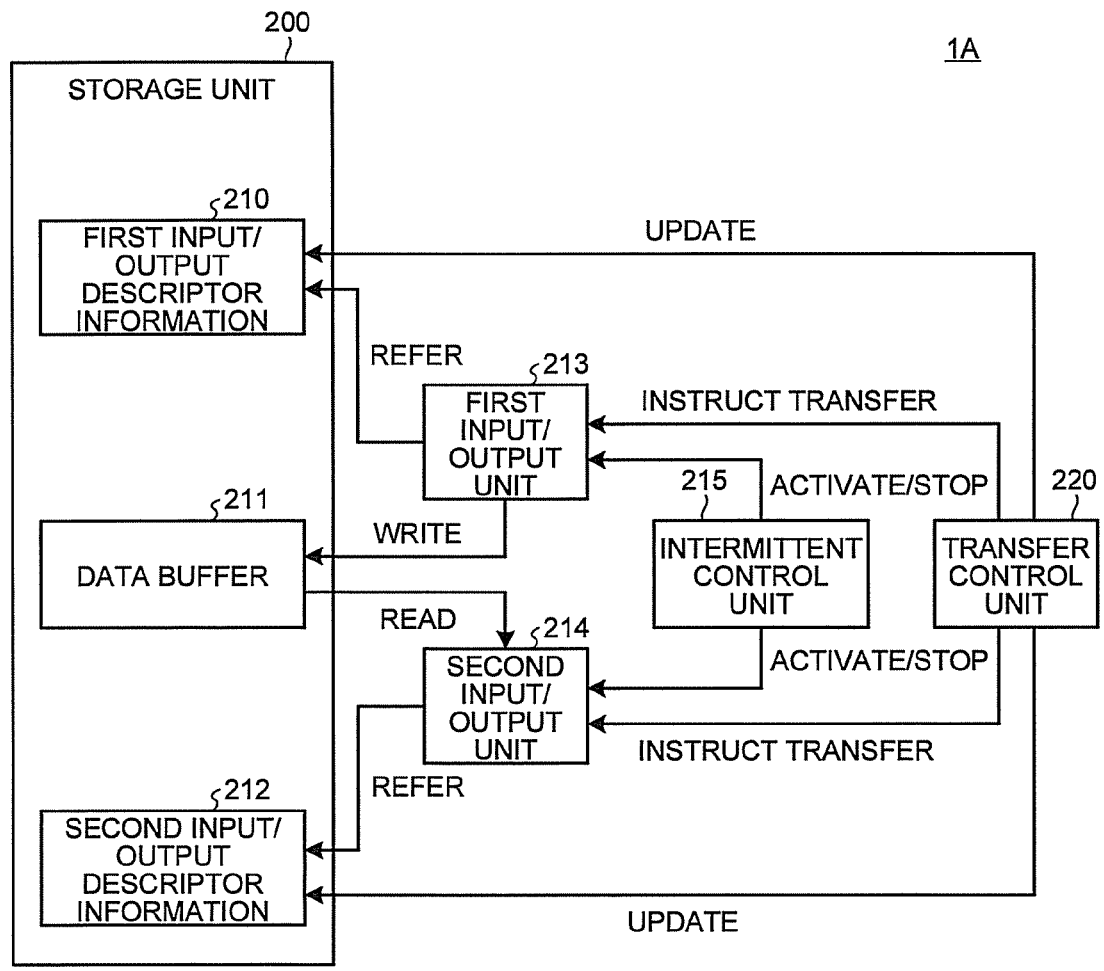
FIG. 5 is an exemplary functional block diagram of an information processing device according to a first embodiment.

Next, a first embodiment will be described. FIG. 5 is an exemplary functional block diagram illustrating functions of an information processing device 1A according to the first embodiment. The information processing device 1A includes a storage unit 200, a first input/output unit 213, a second input/output unit 214, an intermittent control unit 215 and a transfer control unit 220.

The storage unit 200 corresponds to a main memory in a computer system or the like, stores first input/output descriptor information 210 and second input/output descriptor information 212, and has a data buffer 211 in which data are temporarily stored. Although the storage unit 200 is illustrated as being constituted by one memory in FIG. 5, the storage unit 200 is not limited to this example but contents in the storage unit 200 may be distributed across multiple memories.

The first input/output unit 213 and the second input/output unit 214 provide interface functions performing input/output of data in the information processing device 1A similarly to the first input/output unit 103 and the second input/output unit 104 described above. The first input/output unit 213 and the second input/output unit 214 each have a DMAC.

The first input/output descriptor information 210 stored in the storage unit 200 is referred to by the DMAC of the first input/output unit 213 and includes information necessary for performing data transfer by the DMAC. More specifically, the first input/output descriptor information 210 includes entries each including information on a memory area such as a read memory address, a write memory address, and information on the size of data to be transferred. When the first input/output descriptor information 210 relates to writing of transfer data, for example, the size information may be a data size in data write units in the data buffer 211. Each entry has stored therein a status flag indicating the state of the entry. In the first embodiment, the status flag also indicates a state of a memory area indicated in the entry.

The second input/output descriptor information 212 stored in the storage unit 200 is referred to by the DMAC of the second input/output unit 214 and includes information necessary for performing data transfer by the DMAC. Since the second input/output descriptor information 212 has a configuration similar to that of the first input/output descriptor information 210, the description thereof is not repeated here. When the second input/output descriptor information 212 relates to writing of transfer data, for example, the size information may be a data size in data read units in the data buffer 211.

Although not illustrated, the first input/output descriptor information 210 and the second input/output descriptor information 212 are generated and updated by a first input/output control function and a second input/output control function executed according to programs on the CPU. The first input/output control function and the second input/output control function correspond to the first input/output control unit 101 and the second input/output control unit 102 described above.

The data buffer 211 is an area provided in the storage unit 200 for temporarily storing data transferred between the first input/output unit 213 and the second input/output unit 214 similarly to the data buffer 111 described above.

The intermittent control unit 215 controls the operations of the first input/output unit 213 and the second input/output unit 214 to be intermittently suppressed. In addition, the intermittent control unit 105 can suppress the operation of the CPU as appropriate during a period during which the first input/output control function and the second input/output control function do not generate the first input/output descriptor information 210 and the second input/output descriptor information 212.

The transfer control unit 220 issues, to the first input/output unit 213 and the second input/output unit 214, an instruction to transfer the transfer data. In addition, the transfer control unit 220 updates the status flags of the first input/output descriptor information 210 and the second input/output descriptor information 212 with the transfer of the transfer data by the first input/output unit 213 and the second input/output unit 214.

Figure 6:
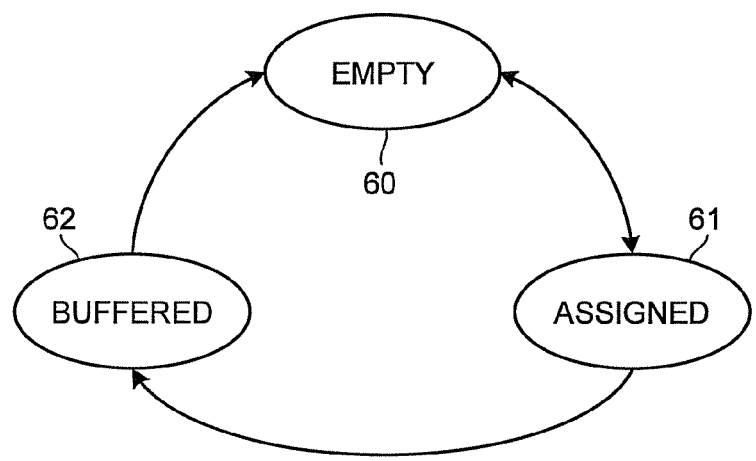
FIG. 6 is a schematic diagram illustrating values to which a status flag can be set according to the first embodiment.

FIG. 6 illustrates transition between values to which a status flag can be set according to the first embodiment. In the first embodiment, a status flag can be set to any of three states: an empty state 60, an assigned state 61 and a buffered state 62.

The empty state 60 is a state in which an entry in which the status flag indicating the empty state 60 is stored is invalid. Specifically, the status flag indicating the empty state 60 indicates that the entry is undefined or the use of information stored in the entry is terminated. An entry with the status flag being set to the empty state 60 can be updated with new information. The initial value of the status flag is the empty state 60.

The assigned state 61 is a state in which an entry in which the status flag indicating the assigned state 61 is stored is valid. Specifically, the status flag indicating the assigned state 61 indicates that the entry is assigned with information and the information is ready to be used. An entry with the status flag being set to the assigned state 61 is prohibited from being updated.

The buffered state 62 indicates that transfer data that are ready to be read are stored in an area of the data buffer 211 indicated by a read address in an entry in which a status flag indicating the buffered state 62 is stored. The status flag indicating the buffered state 62 is defined only when transfer data are to be read from the data buffer 211.

The initial value of the status flag is a value representing the empty state 60. At a time point when the first input/output descriptor information 210 and the second input/output descriptor information 212 are generated and written into the storage unit 200 by the first input/output control function and the second input/output control function, the status flag of each entry is set to the assigned state 61. There may remain entries with the status flag being set to the empty state 60.

As an example, a case in which the first input/output unit 213 writes transfer data into the data buffer 211 and the second input/output unit 214 reads out the transfer data from the data buffer 211 will be described. In this case, the first input/output unit 213 to which the transfer data are input and a transfer instruction is issued by the transfer control unit 220 refers to the first input/output descriptor information 210, selects an entry with the status flag being set to the assigned state 61, and writes the transfer data into the data buffer 211 according to the information in the selected entry.

With the writing of the transfer data, the transfer control unit 220 updates the status flag of the entry in the first input/output descriptor information 210 from the assigned state 61 to the empty state 60, and updates the status flag of the corresponding entry in the second input/output descriptor information 212 from the assigned state 61 to the buffered state 62.

The second input/output unit 214 to which the transfer instruction is issued from the transfer control unit 220 refers to the second input/output descriptor information 212, selects an entry with the status flag being set to the buffered state 62, and reads out the transfer data from the data buffer 211 according to the information in the entry. With the reading of the transfer data, the transfer control unit 220 updates the status flag of the entry in the second input/output descriptor information 212 from the buffered state 62 to the empty state 60.

Figure 7:
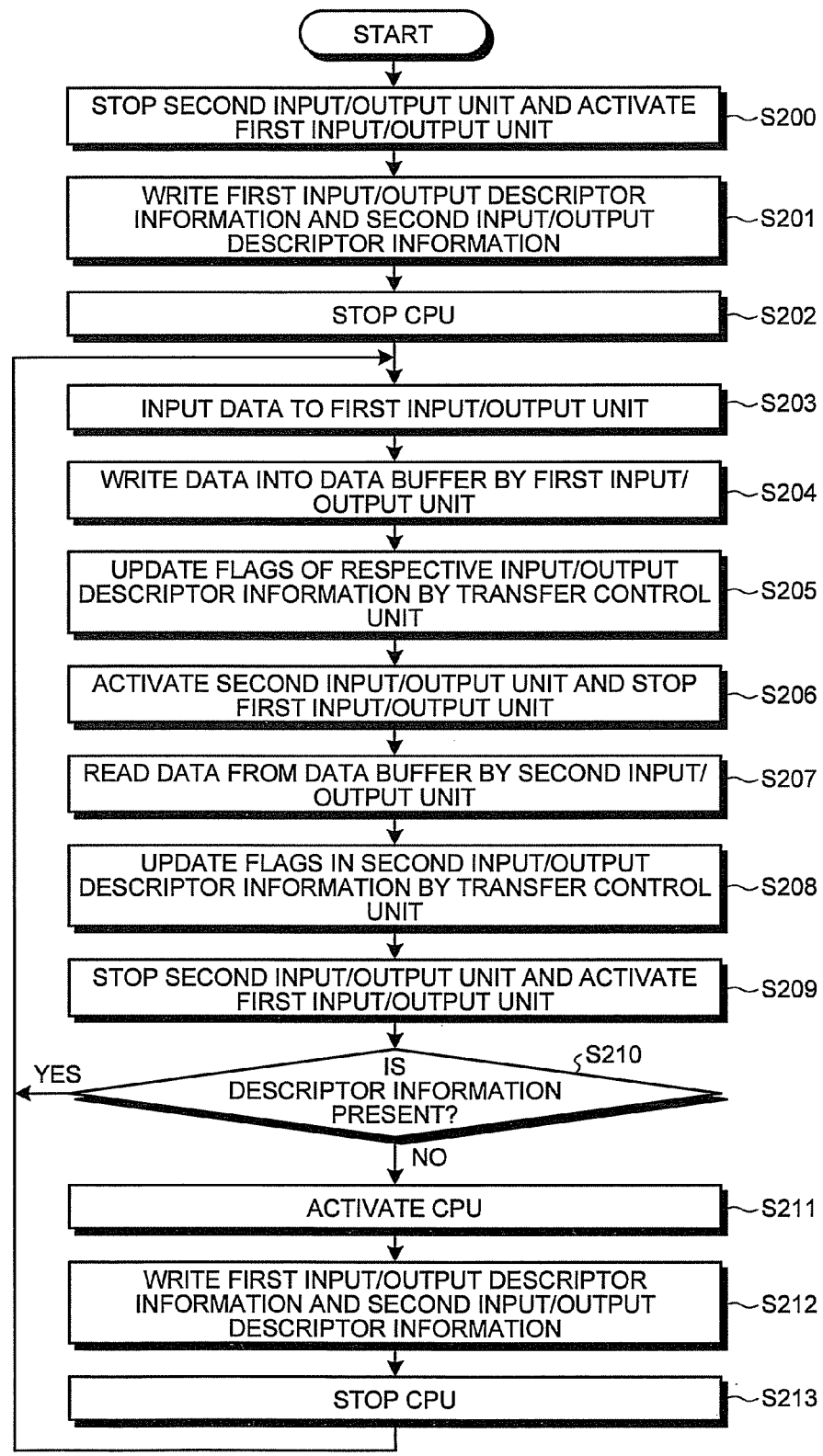
FIG. 7 is an exemplary flowchart of intermittent control according to the first embodiment.

FIG. 7 is an exemplary flowchart of intermittent control according to the first embodiment. In the following, an example in which transfer data are input to the first input/output unit 213 of the information processing device 1A and are passed to the second input/output unit 214 will be described. It is assumed that the operation of the second input/output unit 214 is suppressed (stopped) during a period during which the first input/output unit 213 is operating, and the operation of the first input/output unit 213 is suppressed during a period during which the second input/output unit 214 is operating.

Note that the suppression of the operation of the first input/output unit 213, for example, can be realized by stopping the operation of the first input/output unit 213. The operation of the first input/output unit 213 is stopped by stopping power supply to the first input/output unit 213. Alternatively, clock signals to the first input/output unit 213 may be stopped. The same applies to the second input/output unit 214. In addition, the operation of the CPU (the first input/output control function and the second input/output control function) can also be suppressed in a similar manner. In the following, description will be given assuming that the operations of the respective components are suppressed by stopping the operations of the components.

Although not illustrated, the information processing device 1A has functions corresponding to the first input/output control unit 101 and the second input/output control unit 102 that updates the first input/output descriptor information 110 and the second input/output descriptor information 112, respectively, in the information processing device 100 described with reference to FIG. 1. These functions are implemented by the CPU.

In step S200, the intermittent control unit 215 controls the operation of the second input/output unit 214 to be stopped and the first input/output unit 213 to be activated. The first input/output unit 213 waits for input of transfer data.

In the next step S201, the first input/output control function and the second input/output control function generate the first input/output descriptor information 210 and the second input/output descriptor information 212 and write the same in the storage unit 200, respectively. In this case, the first input/output control function and the second input/output control function generate the entries by using predetermined values for the first input/output descriptor information 210 and the second input/output descriptor information 212, respectively, as read addresses, write addresses and size information, for example. In addition, the first input/output control function and the second input/output control function store a status flag set to the assigned state 61 to each of the generated entries.

Figure 8A:
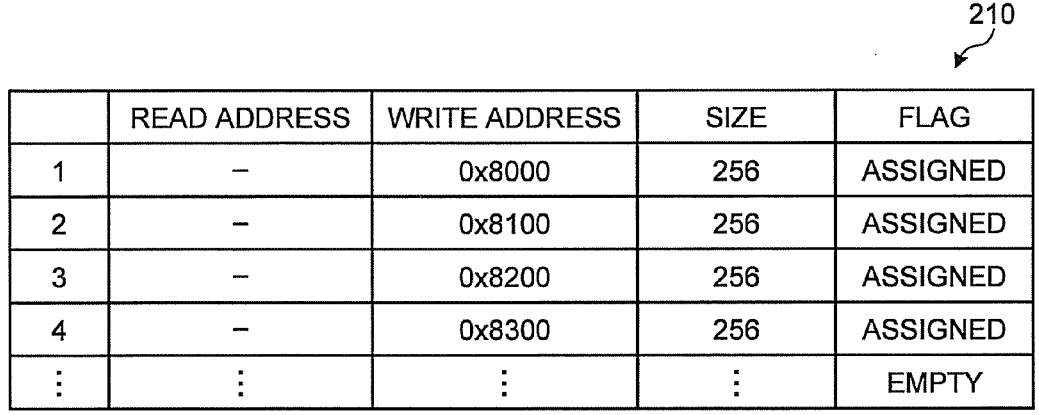
FIGS. 8A and 8B are schematic diagrams illustrating examples of descriptor information according to the first embodiment.

FIG. 8A illustrates an example of the first input/output descriptor information 210 generated in step S201. On the transfer data writing side, the information included in each entry includes a write address and size information and the status flag of each entry is set to the assigned state 61. Note that an entry that does not include the write address and the size information can be generated. In this case, the status flag is set to the empty state 60.

In the first embodiment, it is preferable that more entries than the number of entries corresponding to the transfer data input to the first input/output unit 213 be generated. For example, if two entries are needed to write transfer data input to the first input/output unit 213 in the data buffer 211, three or more entries are generated in advance in step S201.

Figure 8B:
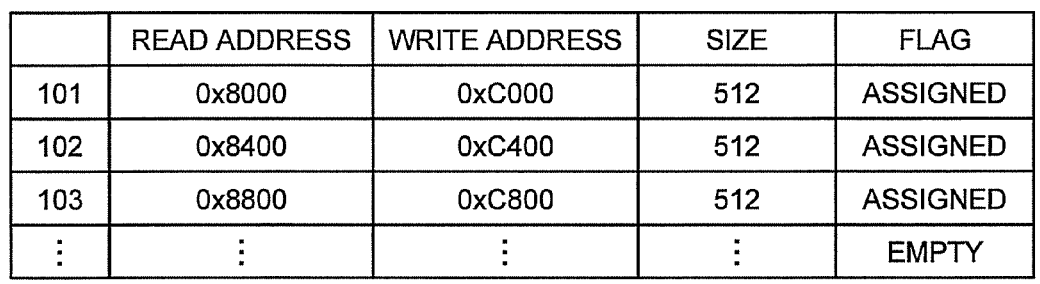

FIG. 8B illustrates an example of the second input/output descriptor information 212 generated in step S201. On the transfer data reading side, the information included in each entry includes a read address, a write address and size information and the status flag of each entry is set to the assigned state 61. Also in this case, an entry that does not include the write address and the size information can be generated. In this case, the status flag is set to the empty state 60.

Similarly, in the second input/output descriptor information 212, more entries than the number of entries corresponding to the transfer data to be written to the data buffer 211, that is, the transfer data input to the first input/output unit 213 are generated. As a result of generating more entries than the number of entries corresponding to the transfer data to be written or read both in the first input/output descriptor information 210 and the second input/output descriptor information 212 as described above, the time period during which the CPU is stopped becomes longer and the effect of reducing power consumption is increased.

Moreover, in the first input/output descriptor information 210 and the second input/output descriptor information 212, it is preferable to generate the entries so that the total of size information of entries of a descriptor relating to reading (the second input/output descriptor information 212, for example) is equal to or larger than the total of size information of entries of a descriptor relating to writing (the first input/output descriptor information 210, for example). According to the examples of FIGS. 8A and 8B, the total of the size information of the entries in the first input/output descriptor information 210 illustrated in FIG. 8A is 1024 bytes while the total of the size information of the entries in the second input/output descriptor information 212 illustrated in FIG. 8B is 1536 bytes. As a result, determination in step S210, which will be described later, is facilitated.

The description refers back to the flowchart of FIG. 7. After writing of the first input/output descriptor information 210 and the second input/output descriptor information 212 into the storage unit 200 is terminated in step S201, the processing proceeds to step S202. In step S202, the intermittent control unit 215 stops the operation of the CPU. In this case, the intermittent control unit 215 may stop the entire operation of the CPU or may stop only the operation of the first input/output control function and the second input/output control function in the CPU, for example.

In the next step S203, the transfer data are input to the first input/output unit 213. When an instruction to transfer the transfer data input from the transfer control unit 220 are passed to the first input/output unit 213, the first input/output unit 213 writes the transferred data into the data buffer 211 in step S204. Specifically, upon receiving the transfer instruction, the first input/output unit 213 refers to the first input/output descriptor information 210 in the storage unit 200, and selects an entry with the status flag being set to the assigned state 61. The first input/output unit 213 then writes the input transfer data into the data buffer 211 according to the information stored in the selected entry. Upon termination of writing the transfer data, the first input/output unit 213 notifies the transfer control unit 220 of the termination.

The processing proceeds to step S205, where the transfer control unit 220 updates the status flags of the first input/output descriptor information 210 and the second input/output descriptor information 212 in response to the notification of the termination of writing the transfer data. Specifically, the transfer control unit 220 updates the status flag of the entry in the first input/output descriptor information 210 including the write address to which the transfer data are written from the assigned state 61 to the empty state 60. At the same time, the transfer control unit 220 updates the status flag of the entry in the second input/output descriptor information 212 including a read address corresponding to the write address from the assigned state 61 to the buffered state 62.

FIG. 9A illustrates an example of the first input/output descriptor information 210 in a state where the status flags are updated from the state in FIG. 8A described above in step S205. In this example, the status flags of a first entry and a second entry including the write addresses to which the transfer data are written are updated from the assigned state 61 to the empty state 60. Specifically, the information of the first entry and the information of the second entry are no longer used as a result of writing the transfer data, and can thus be updated.

FIG. 9B illustrates an example of the second input/output descriptor information 212 in a state where the status flags are updated from the state in FIG. 8B described above in step S205. In this example, the status flag of a first entry including a read address corresponding to the write address to which the transfer data are written are updated from the assigned state 61 to the buffered state 62.

After the status flags are updated in step S205, the update is notified to the intermittent control unit 215, and the processing proceeds to step S206. In step S206, the intermittent control unit 215 instructs the first input/output unit 213 to stop operating and the second input/output unit 214 to be activated in response to the status flag update notification. In response to the instruction, the second input/output unit 214 is activated. Upon completion of activation of the second input/output unit 214, the transfer control unit 220 issues a transfer instruction to the second input/output unit 214.

In the next step S207, the second input/output unit 214 reads the transfer data from the data buffer 211 according to the transfer instruction from the transfer control unit 220. Specifically, in response to the transfer instruction, the second input/output unit 214 refers to the second input/output descriptor information 212 in the storage unit 200 and selects an entry with the status flag being set to the buffered state 62. The second input/output unit 214 then reads out the transfer data from the data buffer 211 according to the information stored in the selected entry, and transfers the transfer data to a write destination indicated by the write address. Upon termination of reading the transfer data, the second input/output unit 214 notifies the transfer control unit 220 of the termination.

In the next step S208, in response to the notification of the termination of reading from the second input/output unit 214, the transfer control unit 220 updates the status flag of the entry in the second input/output descriptor information 212 including the read address from which the transfer data are read from the buffered state 62 to the empty state 60.

FIG. 10 illustrates an example of the second input/output descriptor information 212 in a state where the status flag is updated from the state in FIG. 9B described above in step S208. In this example, the status flag of the first entry including the read address from which the transfer data are read is updated from the buffered state 62 to the empty state 60.

After the status flag is updated in step S208, the update is notified to the intermittent control unit 215, and the processing proceeds to step S209. In step S209, the intermittent control unit 215 instructs the second input/output unit 214 to stop operating and the first input/output unit 213 to be activated in response to the status flag update notification. In response to the instruction, the first input/output unit 213 is activated. The first input/output unit 213 being activated waits for input of transfer data.

In the next step S210, the first input/output unit 213 refers to the first input/output descriptor information 210 and determines whether or not an entry with a flag being defined is present. For example, the first input/output unit 213 determines whether or not an entry with the status flag being set to the assigned state 61 is present in the first input/output descriptor information 210. If it is determined that such an entry is present, the processing returns to step S203, where the first input/output unit 213 waits for input of next transfer data.

If, on the other hand, the first input/output unit 213 determines that no entry with a flag being defined is present in the first input/output descriptor information 210 in step S210, the processing proceeds to step S211. In this case, it is necessary to add entries with flags being defined to the first input/output descriptor information 210 and the second input/output descriptor information 212. Accordingly, the intermittent control unit 215 controls the CPU to be activated in step S211.

In the next step S212, the first input/output control function and the second input/output control function adds entries with flags being defined (the status flags being set to the assigned state 61, for example) to the first input/output descriptor information 210 and the second input/output descriptor information 212 and writes the first input/output descriptor information 210 and the second input/output descriptor information 212 into the storage unit 200. After writing the first input/output descriptor information 210 and the second input/output descriptor information 212 to which the entries are added into the storage unit 200, the first input/output control function and the second input/output control function notify the intermittent control unit 215 of the writing.

The processing then proceeds to step S213, where the intermittent control unit 215 stops the operation of the CPU. Then, the processing returns to step S203. Note that the CPU may be controlled to stop operating by itself.

As described above, according to the first embodiment, the CPU (the first input/output control function and the second input/output control function) prepares the first input/output descriptor information 210 and the second input/output descriptor information 212 in advance before input of transfer data. The processing after input of transfer data is performed by the transfer control unit 220 based on the first input/output descriptor information 210 and the second input/output descriptor information 212 prepared in advance.

As a result, the CPU need not operate after preparing the first input/output descriptor information 210 and the second input/output descriptor information 212. Accordingly, the first embodiment can realize reduction in power consumption more efficiently than the above-described technology in which the CPU (the first input/output control unit 101 and the second input/output control unit 102) generates the first input/output descriptor information 110 and the second input/output descriptor information 112 each time transfer data are input.

Figure 11:
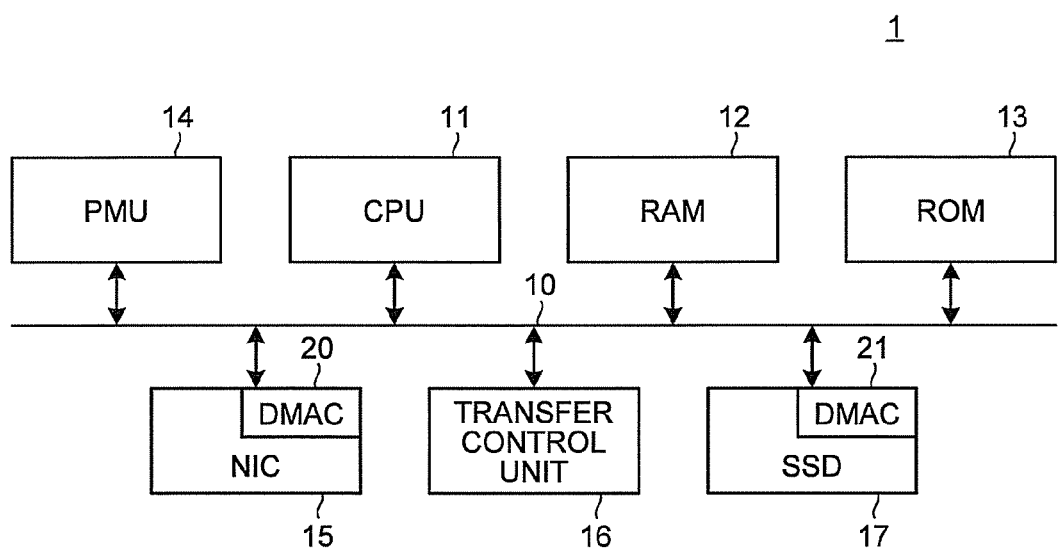
FIG. 11 is a block diagram illustrating an exemplary configuration of an information processing device to which the first embodiment can be applied.

FIG. 11 illustrates an exemplary hardware configuration of an information processing device 1 to which the first embodiment can be applied. The information processing device 1 includes, for example, a CPU 11, a random access memory (RAM) 12, a read only memory (ROM) 13, a power management unit (PMU) 14, a network interface card (NIC) 15, a transfer control unit 16 and a solid state disk (SSD) 17, which are connected by a bus 10 so that the units can communicate with one another. Alternatively, the information processing device 1 may further include a user operation unit such as a keyboard and a display unit for display on a display.

The CPU 11 controls the entire operation of the information processing device 1 by using the RAM 12 as a working memory according to programs stored in advance in the ROM 13 and the SSD 17. The RAM 12 corresponds to the storage unit 200 described above and has the data buffer 211 therein. The first input/output descriptor information 210 and the second input/output descriptor information 212 are written to the RAM 12. In addition, the first input/output control function and the second input/output control function can operate as modules in programs running on the CPU 11.

The NIC 15 controls connection to a network such as a local area network (LAN) or the Internet, and corresponds to the first input/output unit 213 described above, for example. The NIC 15 includes a DMAC 20, which controls data communication via the bus 10, for example. The SSD 17 is a nonvolatile semiconductor memory and has stored therein programs to run on the CPU 11 and various data. The SSD 17 corresponds to the second input/output unit 214 described above, for example. The SSD 17 includes a DMAC 21, which controls data communication via the bus 10, for example.

Note that the first input/output unit 213 is not limited to the NIC 15 but may be another interface for input/output of data such as a USB (universal serial bus) interface or an IEEE (Institute of Electrical and Electronics Engineers) 1394 interface. Similarly, the second input/output unit 214 is not limited to the SSD 17 but may be a hard disk drive (HDD) or a drive unit that can read a disk recording medium such as a compact disk (CD) and a digital versatile disk (DVD). In addition, although the first input/output unit 213 is on the inputting side and the second input/output unit 214 is on the outputting side in the description above, these units are not limited to this example and may be replaced by each other.

The PMU 14 controls power supply to the entire information processing device 1 according to the control of the CPU 11. The PMU 14 can control power supplies of the CPU 11, the NIC 15 and the SSD 17 independently of one another. The PMU 14 corresponds to the intermittent control unit 215 described above.

The transfer control unit 16 corresponds to the transfer control unit 220 described above, provides a transfer instruction to the NIC 15 and the SSD 17 to transfer transfer data and updates the first input/output descriptor information 210 and the second input/output descriptor information 212 written in the RAM 12.

Second Embodiment

Figure 12:
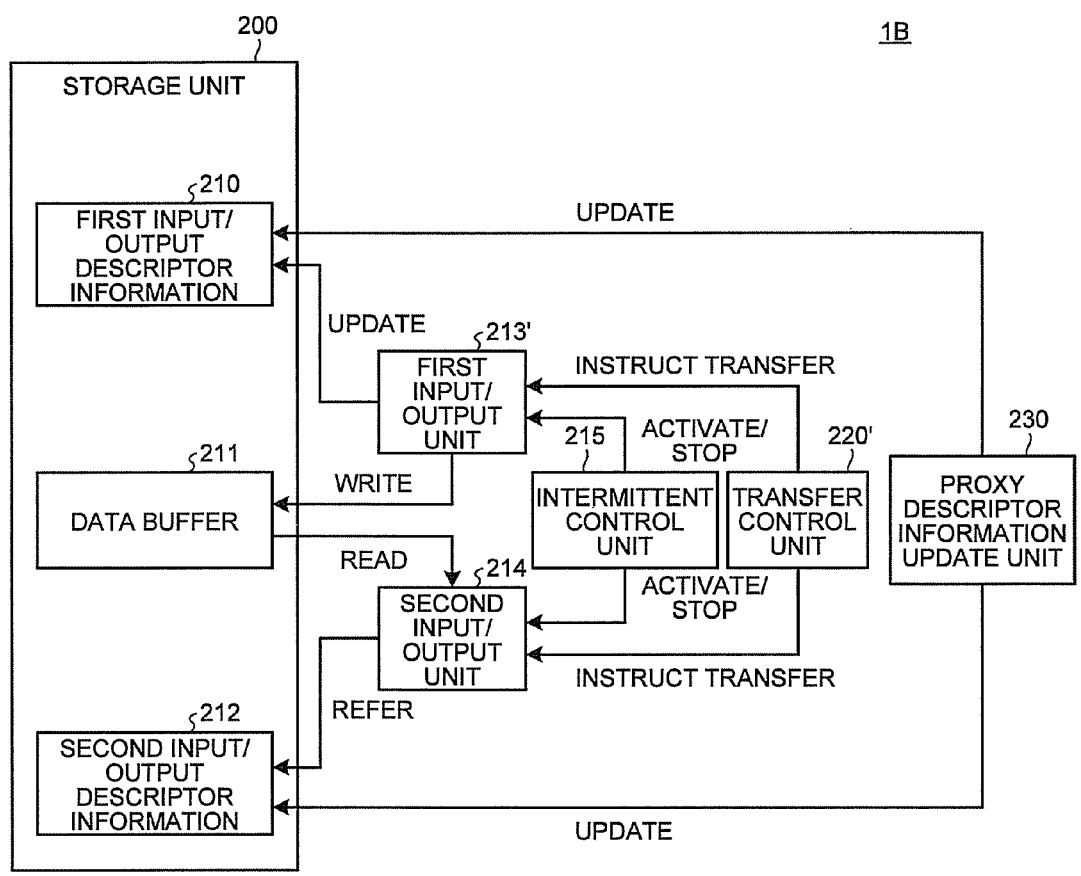
FIG. 12 is an exemplary functional block diagram of an information processing device according to a second embodiment.

Next, a second embodiment will be described. FIG. 12 is an exemplary functional block diagram illustrating functions of an information processing device 1B according to the second embodiment. Parts in FIG. 12 that are the same as those in FIG. 5 described above will be designated by the same reference numerals and detailed description thereof will not be repeated.

The information processing device 1B according to the second embodiment is different from the information processing device 1A according to the first embodiment described above in that a proxy descriptor information update unit 230 is additionally provided. The proxy descriptor information update unit 230 performs update of the status flags in the first input/output descriptor information 210 and the second input/output descriptor information 212 by the transfer control unit 220 in the first embodiment in place of the transfer control unit 220.

In addition, in the second embodiment, a first input/output unit 213' is configured to generate descriptor information corresponding to the first input/output descriptor information 210 by itself according to input transfer data or the like. The descriptor information is generated by a DMAC included in the first input/output unit 213', for example. The proxy descriptor information update unit 230 converts the descriptor information generated and updated by the first input/output unit 213' according to the input transfer data into the first input/output descriptor information 210 described above.

As a result of adding the proxy descriptor information update unit 230, a transfer control unit 220' performs only transfer instruction to the first input/output unit 213' and the second input/output unit 214. The functions of the second input/output unit 214 and the intermittent control unit 215 are the same as those described in the first embodiment. Specifically, the second input/output unit 214 refers to the second input/output descriptor information 212 and reads/writes data from/to the data buffer 211 according to the transfer instruction. In addition, the intermittent control unit 215 controls activation and stopping of the first input/output unit 213' and the second input/output unit 214 and controls activation and stopping of the CPU.

The states (the empty state 60, the assigned state 61 and the buffered state 62) of status flags in the second embodiment are the same as those in the first embodiment described above, and the description thereof will not be repeated here.

Figure 13:
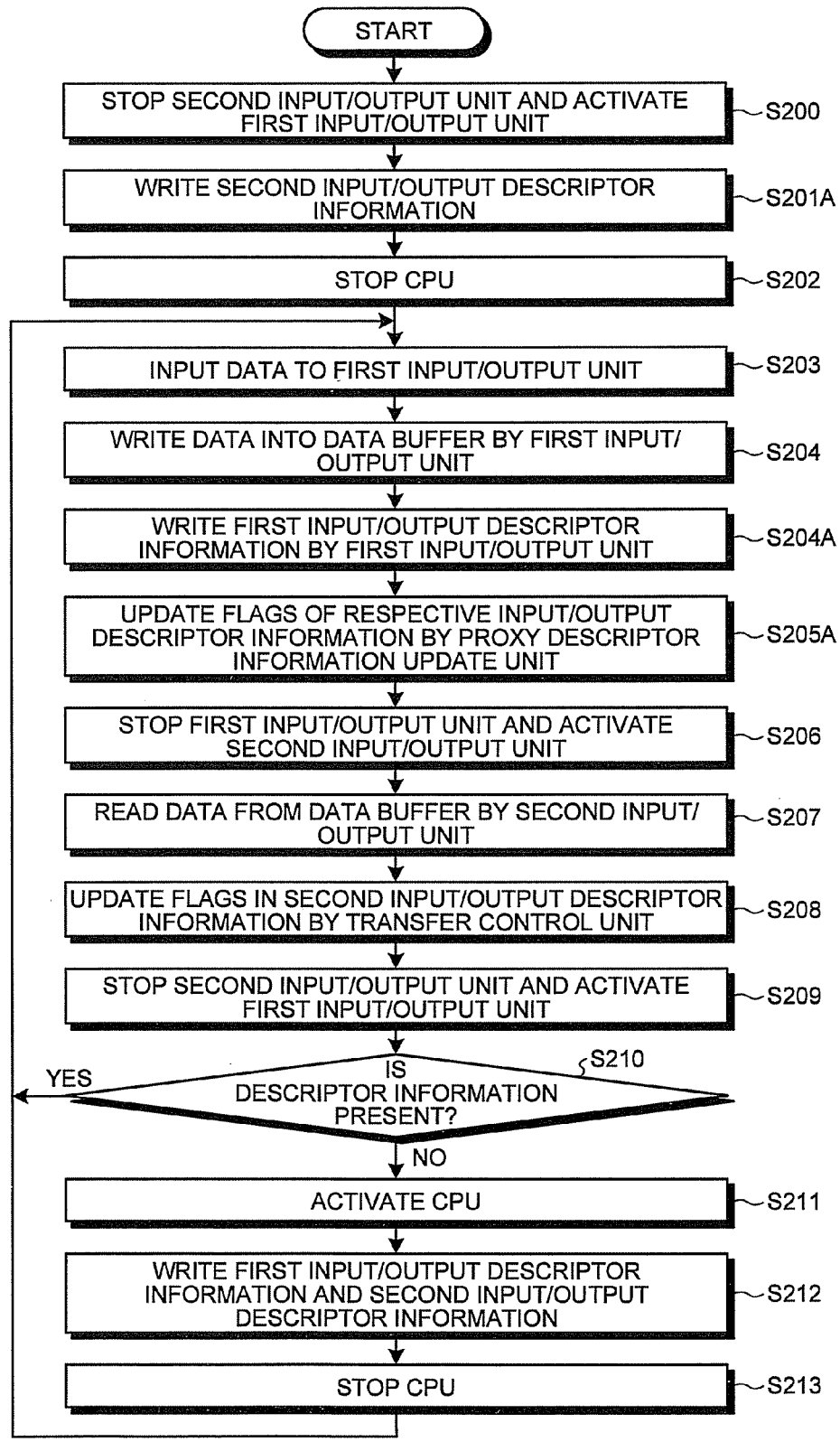
FIG. 13 is an exemplary flowchart of intermittent control according to the second embodiment.

FIG. 13 is an exemplary flowchart of intermittent control according to the second embodiment. Processes in FIG. 13 that are the same as those in the flowchart of FIG. 7 described above will be designated by the same reference numerals and detailed description thereof will not be repeated.

In the following, an example in which transfer data are input to the first input/output unit 213' of the information processing device 1B and are passed to the second input/output unit 214 will be described. It is assumed that the operation of the second input/output unit 214 is stopped during a period during which the first input/output unit 213' is operating, and the operation of the first input/output unit 213' is stopped during a period during which the second input/output unit 214 is operating.

Although not illustrated, the information processing device 1B has the first input/output control function and the second input/output control function running on the CPU and configured to update the first input/output descriptor information 210 and the second input/output descriptor information 212, respectively, similarly to the information processing device 1A described above.

In step S200, the intermittent control unit 215 controls the operation of the second input/output unit 214 to be stopped and the first input/output unit 213' to be activated. The first input/output unit 213' waits for input of transfer data.

In the next step S201A, the second input/output control function generates the second input/output descriptor information 212 and stores the same in the storage unit 200. In this case, the second input/output control function generates entries each including a read address, a write address and size information, for example, and stores a status flag set to the assigned state 61 in each of the generated entries as described with reference to FIG. 8B.

In the next step S202, the intermittent control unit 215 stops the operation of the CPU. In this case, the intermittent control unit 215 may stop only the operation of the CPU executing the first input/output control function and the second input/output control function or may stop the entire operation of the CPU. Alternatively, the operation of the CPU may be stopped by the CPU itself.

In the next step S203, transfer data are input to the first input/output unit 213'. When an instruction to transfer the transfer data is passed from the transfer control unit 220' to the first input/output unit 213', the first input/output unit 213' writes the transfer data into the data buffer 211 in step S204.

In the next step S204A, the first input/output unit 213' generates an entry including a write address in the data buffer 211 and size information for the transfer data written in step S204, and writes the generated entry as the first input/output descriptor information 210 into the storage unit 200. At this time, a status flag set to the assigned state 61 is stored in the entry. Upon writing the first input/output descriptor information 210 into the storage unit 200, the first input/output unit 213' notifies the proxy descriptor information update unit 230 of the writing.

In the next step S205A, the proxy descriptor information update unit 230 updates status flags in the first input/output descriptor information 210 and the second input/output descriptor information 212 in response to the notification from the first input/output unit 213'. Specifically, the proxy descriptor information update unit 230 updates the status flag set in the entry in the first input/output descriptor information 210 written in step S204A from the assigned state 61 to the empty state 60. At the same time, the proxy descriptor information update unit 230 updates the status flag of the entry in the second input/output descriptor information 212 including a read address corresponding to the write address included in the entry written by the first input/output unit 213' in step S204A to the buffered state 62. After the status flags are updated, the update is notified to the intermittent control unit 215.

The processing proceeds to step S206, where the intermittent control unit 215 instructs the first input/output unit 213' to stop operating and the second input/output unit 214 to be activated in response to the status flag update notification. In response to the instruction, the second input/output unit 214 is activated. Upon completion of activation of the second input/output unit 214, the transfer control unit 220' issues a transfer instruction to the second input/output unit 214.

In the next step S207, in response to the transfer instruction from the transfer control unit 220', the second input/output unit 214 refers to the second input/output descriptor information 212 and selects the entry with the status flag being set to the buffered state 62. The second input/output unit 214 then reads out the transfer data from the data buffer 211 according to the information stored in the selected entry, and transfers the transfer data to a write destination indicated by the write address. Upon termination of reading the transfer data, the second input/output unit 214 notifies the transfer control unit 220' of the termination.

In the next step S208, in response to the notification of the termination of reading from the second input/output unit 214, the transfer control unit 220' updates the status flag of the entry in the second input/output descriptor information 212 including the read address from which the transfer data are read from the buffered state 62 to the empty state 60. After the status flags are updated, the update is notified to the intermittent control unit 215.

In the next step S209, the intermittent control unit 215 instructs the second input/output unit 214 to stop operating and the first input/output unit 213' to be activated in response to the status flag update notification. In response to the instruction, the first input/output unit 213' is activated. The first input/output unit 213' being activated waits for input of transfer data.

In the next step S210, the first input/output unit 213' refers to the first input/output descriptor information 210, and determines whether or not an entry with a flag being defined, for example a status flag being set to the assigned state 61, is present. If it is determined that such an entry is present, the processing returns to step S203, where the first input/output unit 213' waits for input of next transfer data.

If, on the other hand, the first input/output unit 213' determines that no entry with a flag being defined is present in the first input/output descriptor information 210 in step S210, the processing proceeds to step S211. In this case, it is necessary to add entries with flags being defined to the first input/output descriptor information 210 and the second input/output descriptor information 212. Accordingly, the intermittent control unit 215 controls the CPU to be activated in step S211.

In the next step S212, the first input/output control function and the second input/output control function add entries with flags being defined (the status flags being set to the assigned state 61, for example) to the first input/output descriptor information 210 and the second input/output descriptor information 212, respectively, and writes the first input/output descriptor information 210 and the second input/output descriptor information 212 into the storage unit 200. After writing the first input/output descriptor information 210 and the second input/output descriptor information 212 to which the entries are added into the storage unit 200, the first input/output control function and the second input/output control function notify the intermittent control unit 215 of the writing.

The processing then proceeds to step S213, where the intermittent control unit 215 stops the operation of the CPU. Then, the processing returns to step S203. Note that the CPU may be controlled to stop operating by itself.

As described above, according to the second embodiment, the same effects as in the first embodiment can be produced even in a case where the first input/output unit 213' generates descriptor information corresponding to the first input/output descriptor information 210 by itself according to input transfer data or the like. Specifically, the descriptor information generated by the first input/output unit 213' is updated by the proxy descriptor information update unit 230, and the CPU need not operate after preparing the first input/output descriptor information 210 and the second input/output descriptor information 212. The reduction in power consumption can therefore be realized more efficiently.

A hardware configuration of the information processing device 1B according to the second embodiment can be realized by adding the proxy descriptor information update unit 230 to the information processing device 1 according to the first embodiment described with reference to FIG. 11 and connecting the proxy descriptor information update unit 230 by the bus 10.

Third Embodiment

Figure 14:
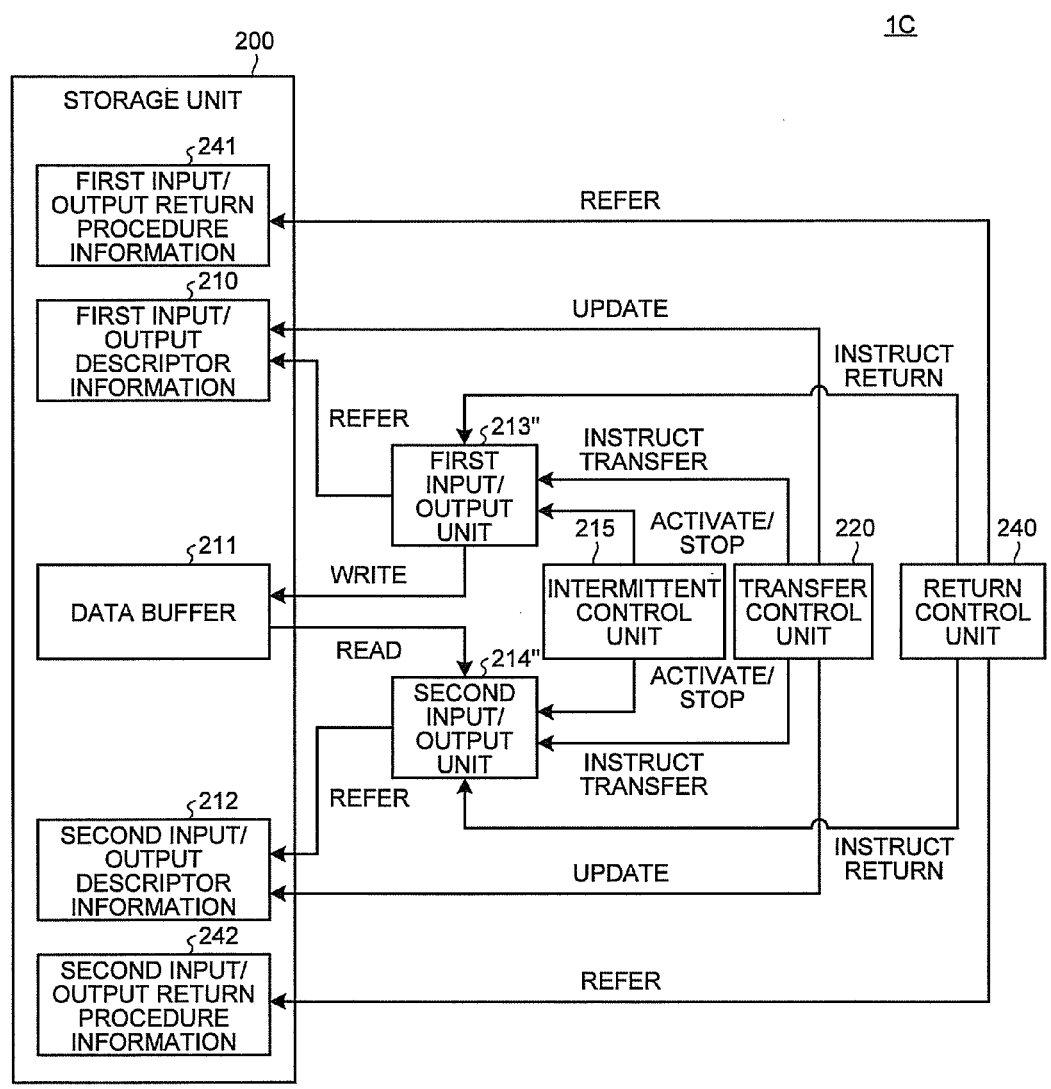
FIG. 14 is an exemplary functional block diagram of an information processing device according to a third embodiment.

Next, a third embodiment will be described. FIG. 14 is an exemplary functional block diagram illustrating functions of an information processing device 1C according to the third embodiment. Parts in FIG. 14 that are the same as those in FIG. 5 described above will be designated by the same reference numerals and detailed description thereof will not be repeated.

The information processing device 1C according to the third embodiment is different from the information processing device 1A according to the first embodiment described above in that a return control unit 240 is additionally provided. In addition, first input/output return procedure information 241 and second input/output return procedure information 242 indicating return procedures for activating a first input/output unit 213" and a second input/output unit 214", respectively, from a stopped state are stored in the storage unit 200.

The return control unit 240 refers to the first input/output return procedure information 241 to activate the first input/output unit 213", for example. The return control unit 240 then issues a return instruction to the first input/output unit 213" to activate the first input/output unit 213" according to contents of the first input/output return procedure information 241. Similarly, to activate the second input/output unit 214", the return control unit 240 refers to the second input/output return procedure information 242 and issues a return instruction to the second input/output unit 214".

Note that the first input/output unit 213" and the second input/output unit 214" have functions equivalent to those of the first input/output unit 213 and the second input/output unit 214 except that the first input/output unit 213" and the second input/output unit 214" are activated according to return instructions from the return control unit 240.

The states (the empty state 60, the assigned state 61 and the buffered state 62) of status flags in the third embodiment are the same as those in the first embodiment described above, and the description thereof will not be repeated here.

FIG. 15 is an exemplary flowchart of intermittent control according to the third embodiment. Processes in FIG. 15 that are the same as those in the flowchart of FIG. 7 described above will be designated by the same reference numerals and detailed description thereof will not be repeated.

In the following, an example in which transfer data are input to the first input/output unit 213" of the information processing device 1C and are passed to the second input/output unit 214" will be described. It is assumed that the operation of the second input/output unit 214" is stopped during a period during which the first input/output unit 213" is operating, and the operation of the first input/output unit 213" is stopped during a period during which the second input/output unit 214" is operating.

Although not illustrated, the information processing device 1C has the first input/output control function and the second input/output control function running on the CPU and configured to update the first input/output descriptor information 210 and the second input/output descriptor information 212, respectively, similarly to the information processing device 1A described above.

In step S200, the intermittent control unit 215 controls the operation of the second input/output unit 214" to be stopped and the first input/output unit 213" to be activated. The first input/output unit 213" waits for input of transfer data. It is assumed here that the first input/output unit 213" is activated in advance.

In the next step S201, the first input/output control function and the second input/output control function generates the first input/output descriptor information 210 and the second input/output descriptor information 212 and writes the same into the storage unit 200, respectively. In this case, the first input/output control function and the second input/output control function generate entries each including a read address, a write address and size information, for example, and store a status flag set to the assigned state 61 to each of the generated entries as described with reference to FIGS. 8A and 8B.

In the next step S202, the intermittent control unit 215 stops the operation of the CPU. In this case, the intermittent control unit 215 may stop only the operation of the CPU executing the first input/output control function and the second input/output control function or may stop the entire operation of the CPU. Alternatively, the operation of the CPU may be stopped by the CPU itself.

In the next step S203, the transfer data are input to the first input/output unit 213". When an instruction to transfer the transfer data is passed from the transfer control unit 220 to the first input/output unit 213", the first input/output unit 213" writes the transfer data into the data buffer 211 in step S204. Upon termination of writing the transfer data, the first input/output unit 213" notifies the transfer control unit 220 of the termination.

In the next step S205, the transfer control unit 220 updates the status flags of the first input/output descriptor information 210 and the second input/output descriptor information 212 in response to the notification of the termination of writing the transfer data. Specifically, the transfer control unit 220 updates the status flag of an entry in the first input/output descriptor information 210 including a write address to which the transfer data are written from the assigned state 61 to the empty state 60. At the same time, the transfer control unit 220 updates the status flag of the entry in the second input/output descriptor information 212 including a read address corresponding to the write address from the assigned state 61 to the buffered state 62. After the status flags are updated, the update is notified to the intermittent control unit 215.

In the next step S206, the intermittent control unit 215 instructs the first input/output unit 213" to stop operating in response to the status flag update notification. The intermittent control unit 215 also instructs the second input/output unit 214" to be activated and notifies the return control unit 240 of the activation of the second input/output unit 214".

In the next step S220, the return control unit 240 refers to the second input/output return procedure information 242 in response to the notification of the activation of the second input/output unit 214". The return control unit 240 then issues a return instruction to the second input/output unit 214" to set and activate the second input/output unit 214" according to contents of the second input/output return procedure information 242. Upon completion of activation of the second input/output unit 214", the transfer control unit 220 issues a transfer instruction to the second input/output unit 214".

In the next step S207, in response to the transfer instruction from the transfer control unit 220, the second input/output unit 214" refers to the second input/output descriptor information 212 and selects an entry with the status flag being set to the buffered state 62. The second input/output unit 214" then reads out the transfer data from the data buffer 211 according to the information stored in the selected entry, and transfers the transfer data to a write destination indicated by the write address. Upon termination of reading the transfer data, the second input/output unit 214" notifies the transfer control unit 220 of the termination.

In the next step S208, in response to the notification of the termination of reading from the second input/output unit 214", the transfer control unit 220 updates the status flag of the entry in the second input/output descriptor information 212 including the read address from which the transfer data are read from the buffered state 62 to the empty state 60. After the status flags are updated, the update is notified to the intermittent control unit 215.

In the next step S209, the intermittent control unit 215 instructs the second input/output unit 214" to stop operating in response to the status flag update notification. The intermittent control unit 215 also instructs the first input/output unit 213" to be activated and notifies the return control unit 240 of the activation of the first input/output unit 213".

In the next step S221, the return control unit 240 refers to the first input/output return procedure information 241 in response to the notification of the activation of the first input/output unit 213". The return control unit 240 then issues a return instruction to the first input/output unit 213" to set and activate the first input/output unit 213" according to contents of the first input/output return procedure information 241.

In the next step S210, the first input/output unit 213" refers to the first input/output descriptor information 210, and determines whether or not an entry with a flag being defined, for example a status flag being set to the assigned state 61, is present. If it is determined that such an entry is present, the processing returns to step S203, where the first input/output unit 213" waits for input of next transfer data.

If, on the other hand, the first input/output unit 213" determines that no entry with a flag being defined is present in the first input/output descriptor information 210 in step S210, the processing proceeds to step S211. In this case, it is necessary to add entries with flags being defined to the first input/output descriptor information 210 and the second input/output descriptor information 212. Accordingly, the intermittent control unit 215 controls the first input/output control function and the second input/output control function, that is the CPU, to be activated in step S211.

In the next step S212, the first input/output control function and the second input/output control function adds entries with flags being defined (the status flags being set to the assigned state 61, for example) to the first input/output descriptor information 210 and the second input/output descriptor information 212 and writes the first input/output descriptor information 210 and the second input/output descriptor information 212 into the storage unit 200. After writing the first input/output descriptor information 210 and the second input/output descriptor information 212 to which the entries are added into the storage unit 200, the first input/output control function and the second input/output control function notify the intermittent control unit 215 of the writing.

Then, the processing proceeds to step S213, where the intermittent control unit 215 stops the operation of the first input/output control function and the second input/output control function, that is the CPU. The processing then returns to step S203. Note that the CPU may be controlled to stop operating by itself.

As described above, according to the third embodiment, the return control unit 240 that controls the returning from the stopped state to the activated state in activating the first input/output unit 213" and the second input/output unit 214" is provided. It is therefore possible to immediately start the data transfer as soon as the first input/output unit 213" and the second input/output unit 214" are activated.

A hardware configuration of the information processing device 1C according to the third embodiment can be realized by adding the return control unit 240 to the information processing device 1 according to the first embodiment described with reference to FIG. 11 and connecting the return control unit 240 by the bus 10.

Although the second embodiment and the third embodiment are described above as being implemented independently of each other, the embodiments are not limited to this example. That is, the second embodiment and the third embodiment can be implemented in combination.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An information processing device comprising:
 a generating unit configured to generate a descriptor including information indicating an area in a storage unit, and state information indicating a state of an entry in which the information indicating the area is stored;
 an input/output unit configured to perform at least one of writing and reading data to/from the area indicated in the entry selected according to the state information;
 an update unit configured to update the state information according to at least one of the writing and reading of data in the area by the input/output unit; and
 an intermittent control unit configured to suppress operation of the input/output unit when at least one of the writing and reading of data to/from the storage unit by the input/output unit is terminated, wherein
 the generating unit generates the descriptor in advance before at least one of the writing and reading of data into the storage unit by the input/output unit is started,
 the state information includes a first state indicating that the information of the entry is invalid and a second state indicating that the information of the entry is valid, and the state information further includes a third state indicating a state waiting for reading the data when the input/output unit is to read data, and
 the input/output unit selects the state information in the second state for data writing, and selects the state information in the third state for data reading.

2. The information processing device according to claim 1, further comprising:
 a return procedure storage unit configured to store return procedures for returning the input/output unit from a state where operation thereof is suppressed; and
 a return control unit configured to return the input/output unit with the operation thereof being suppressed by the intermittent control unit from the state where the operation thereof is suppressed according to the return procedures stored in the return procedure storage unit.

3. A program product having a non-transitory computer-readable storage medium including programmed instructions executed by a computer which comprises:
 an input/output unit configured to perform at least one of writing and reading data to an area in a storage unit indicated by an entry selected according to state information indicating a state of the entry in which information indicating the area in the storage unit included in a descriptor is stored;

an update unit configured to update the state information according to at least one of the writing and reading of data in the area by the input/output unit; and an intermittent control unit configured to suppress operation of the input/output unit when at least one of the writing and reading of data to/from the storage unit by the input/output unit is terminated, wherein the state information includes a first state indicating that the information of the entry is invalid and a second state indicating that the information of the entry is valid, and the state information further includes a third state indicating a state waiting for reading the data when the input/output unit is to read data, the input/output unit selects the state information in the second state for data writing, and selects the state information in the state for data reading, and the program product comprises an instruction for making the computer generate the descriptor in advance before at least one of the writing and reading data to/from the storage unit by the input/output unit.

4. The program product according to claim 3, further comprising:

a return procedures storage unit configured to store return procedures for returning the input/output unit from a state where operation thereof is suppressed; and a return control unit configured to return the input/output unit with the operation thereof being suppressed by the intermittent control unit from the state where the operation thereof is suppressed according to the return procedures stored in the return procedure storage unit.

5. An information processing device comprising:

a generating unit configured to generate a descriptor including information indicating an area in a storage unit, and state information indicating a state of an entry in which the information indicating the area is stored;

an input/output unit configured to perform at least one of writing and reading data to/from the area indicated in the entry selected according to the state information;

an update unit configured to update the state information according to at least one of the writing and reading of data in the area by the input/output unit; and an intermittent control unit configured to suppress operation of the input/output unit when at least one of the writing and reading of data to/from the storage unit by the input/output unit is terminated, wherein the generating unit generates the descriptor in advance before at least one of the writing and reading of data into the storage unit by the input/output unit is started, the state information includes a first state indicating that the information of the entry is invalid and a second state indicating that the information of the entry is valid, when writing data in the area, the input/output unit writes information indicating the area into the descriptor and sets the state information to the second state, and the update unit updates the state information having been set to the second state by the input/output unit to the first state when the input/output unit writes data in the area.

6. The information processing device according to claim 5, further comprising:

a return procedure storage unit configured to store return procedures for returning the input/output unit from a state where operation thereof is suppressed; and a return control unit configured to return the input/output unit with the operation thereof being suppressed by the intermittent control unit from the state where the operation thereof is suppressed according to the return procedures stored in the return procedure storage unit.

7. A program product having a non-transitory computer-readable storage medium including programmed instructions executed by a computer which comprises:

an input/output unit configured to perform at least one of writing and reading data to an area in a storage unit indicated by an entry selected according to state information indicating a state of the entry in which information indicating the area in the storage unit included in a descriptor is stored;

an update unit configured to update the state information according to at least one of the writing and reading of data in the area by the input/output unit; and an intermittent control unit configured to suppress operation of the input/output unit when at least one of the writing and reading of data to/from the storage unit by the input/output unit is terminated, wherein the state information includes a first state indicating that the information of the entry is invalid and a second state indicating that the information of the entry is valid, when writing data in the area, the input/output unit writes information indicating the area into the descriptor and sets the state information to the second state, the update unit updates the state information having been set to the second state by the input/output unit to the first state when the input/output unit writes data in the area, and the program product comprises an instruction for making the computer generate the descriptor in advance before at least one of the writing and reading data to/from the storage unit by the input/output unit.

8. The program product according to claim 7, further comprising:

a return procedure storage unit configured to store return procedures for returning the input/output unit from a state where operation thereof is suppressed; and a return control unit configured to return the input/output unit with the operation thereof being suppressed by the intermittent control unit from the state where the operation thereof is suppressed according to the return procedures stored in the return procedures storage unit.

* * * * *